Feb. 21, 1956  P. G. PATER  2,735,461

PRESS FOR MAKING MULTI-PLY PANELS

Filed Oct. 15, 1953  3 Sheets-Sheet 1

INVENTOR.
Paul G. Pater
BY
Murray, Sackhoff & Murray
ATT'YS

Feb. 21, 1956 P. G. PATER 2,735,461
PRESS FOR MAKING MULTI-PLY PANELS
Filed Oct. 15, 1953 3 Sheets-Sheet 2
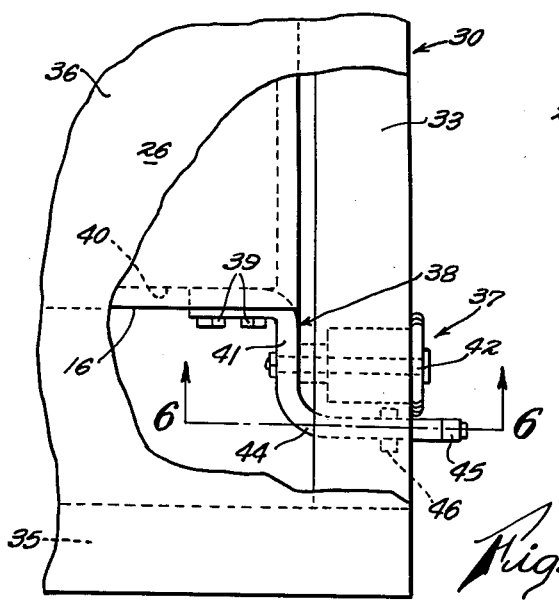
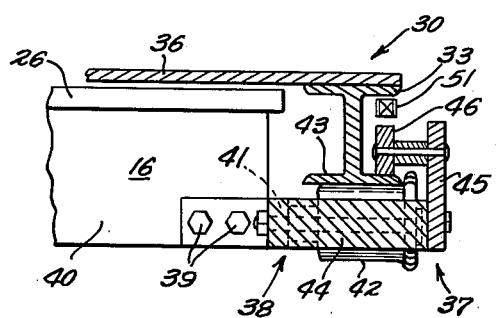
INVENTOR.
Paul G. Pater
BY
Murray, Sackhoff & Murray
ATT'YS INVENTOR.
Paul G. Pater United States Patent Office 2,735,461
Patented Feb. 21, 1956

2,735,461

PRESS FOR MAKING MULTI-PLY PANELS

Paul G. Pater, Hamilton, Ohio, assignor to Columbia Machinery and Engineering Corporation, Hamilton, Ohio Application October 15, 1953, Serial No. 386,348

5 Claims. (Cl. 144—281)

The present invention relates to presses and is particularly directed to a loading and unloading device for a vertically operated, multi-platen press designed for the manufacture of plywood panels, or the like.

One of the principal objects of this invention is to provide a press construction which will contribute materially in expediting production of multi-ply panels in that each work supporting platen of a two-station press has a novel two-place charging and discharging table associated therewith, said tables being simultaneously shiftable in opposite work carrying directions between work pressing positions and work loading-unloading positions.

Another object of the invention resides in the provision of a novel means for mounting a loading and unloading mechanism entirely on each of the two work supporting platens for operative movements between pressing and charging-discharging positions thereon, and in the manner of shiftably operating said mechanisms in timed relation. These features in combination with the one set forth in the previous paragraph provides a loading and unloading device which may readily be installed on a two-station press and furnishes a mechanism with relatively few parts that are individually simple and rugged in construction.

A further and more specific object is to provide, in an apparatus of the type set forth, a pair of oppositely shiftable work carrying tables each mounted on its respective press platen and each having two places which alternately and simultaneously serve as a work unloading-loading section and a pressing section for its respective platen.

The novel construction for obtaining the foregoing advantages will be made more apparent as this description proceeds, and it should be understood that the invention contemplates other features which will be set forth in the following description, especially when considered with the accompanying drawings, wherein:

Fig. 3 is an enlarged front elevation of the machine, the oppositely projecting ends of the work tables being broken away.

Fig. 5 is a fragmental plan view of a work table support situated at each corner of the work supporting platens.

Fig. 6 is a section taken on line 6—6 of Fig. 5.

Figure 1:
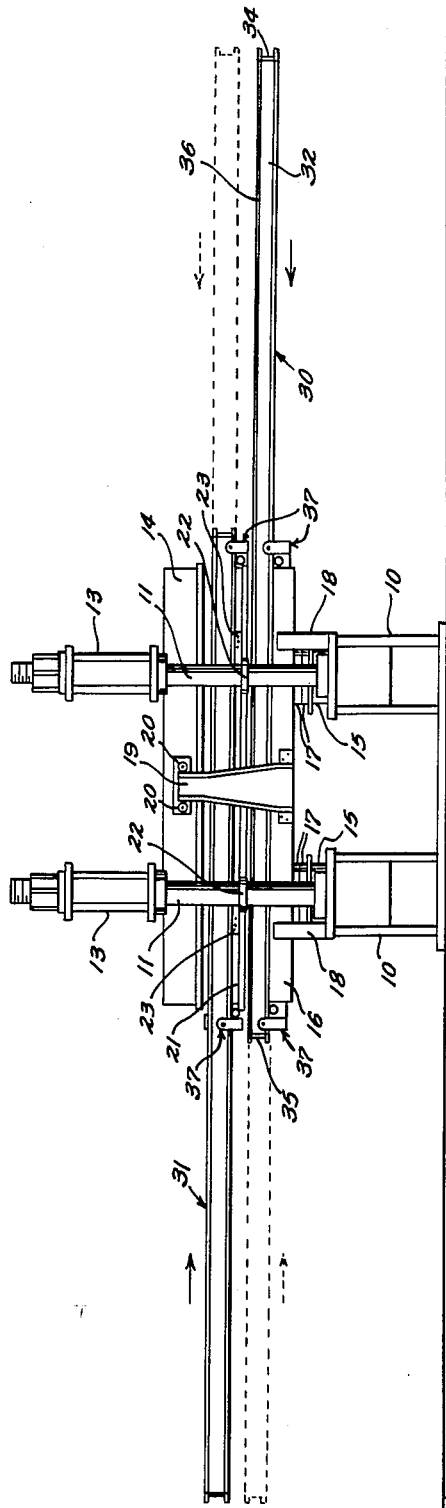
Fig. 1 is a side elevation of a device made in accordance with this invention.

In these views the numerals 10—10 indicate two longitudinally spaced, lateral base members each supporting a standard 11 at its front portion and a standard 12 adjacent its rear edge portion. Each pair of standards 11—12 support a cross frame structure 13 between them and said structures in turn support a horizontal, stationary platen 14. Each base member 10 carries a pair of laterally spaced, vertically acting power cylinders 15—15, the two pairs of cylinders supporting a horizontally disposed, vertically movable press platen 16. This movable platen 16 is supported on the vertically movable piston of each power cylinder by one or more spacer blocks 17 to provide for adjustment between the spaced apart positions of the stationary platen 14 and the movable platen 16 to accommodate the press to different thicknesses of work pieces. A laterally spaced pair of upstanding guides 18 is secured to each of the base members 10 to prevent transverse movement of the platen 16 with respect to the frame work, whilst a guide arm 19 is fixed on each side of the platen 16 and each extends upwardly between a pair of guide rollers 20—20 mounted on each side of the platen 14 to preclude longitudinal displacement of the platen 16 with respect to the platen 14 during press operation.

Figure 4:
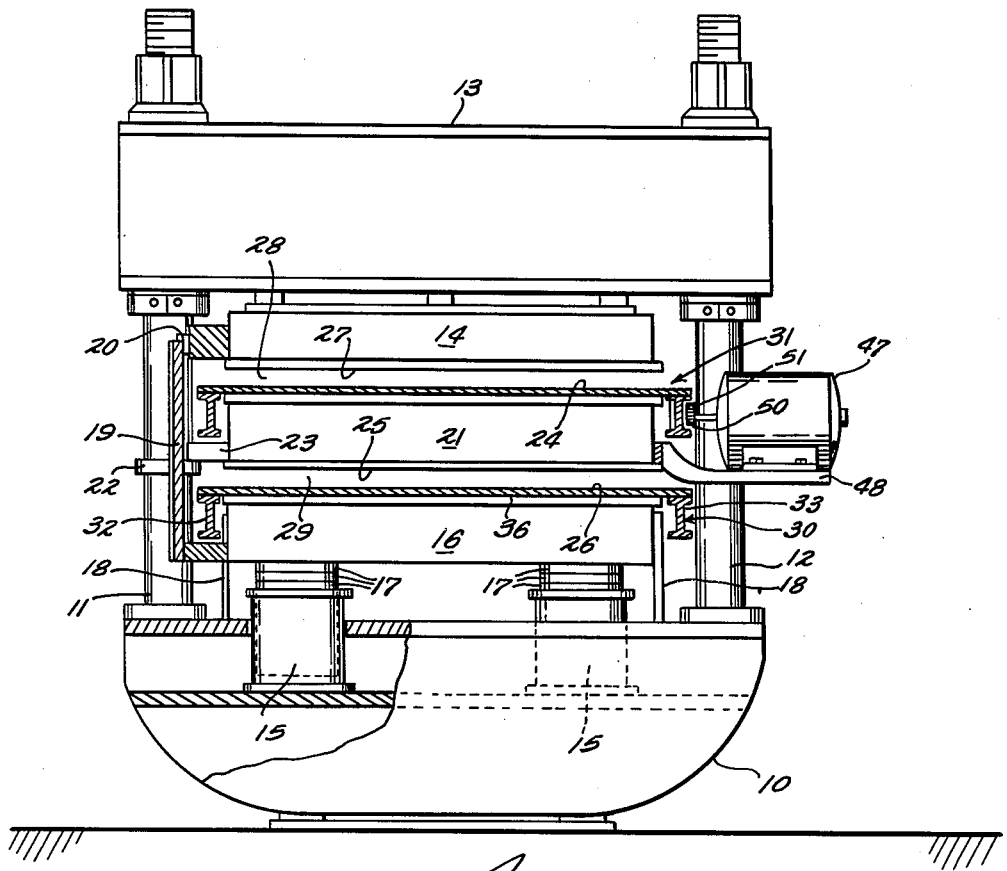
Fig. 4 is an upright, enlarged section taken on line 4—4 of Fig. 2, parts thereof being broken away.

An intermediate, upwardly movable platen 21 is normally supported by the standards 11—12, this platen support comprising fixed shoulders 22 on each standard that are each engaged by a supporting arm 23 fixed to a side of the platen 21 and engaged upon a cooperating shoulder 22. Each arm has a loose fit with its standard to slidably engage it and guide the platen 21 in a vertical path in response to upward pressure exerted on its underside. As best shown in Figs. 3 and 4 the intermediate platen 21 has an upper work supporting face 24 and a lower work contacting surface 25, whilst the platen 16 has a work supporting surface 26 and platen 14 has an interior pressure face 27 which respectively cooperate with the faces 25 and 24 to provide a two-station press with work receiving lights 28 and 29. All of the platens may be provided with steam pipes and a source of steam (not shown) for maintaining the cooperative faces of the platens at predetermined temperatures for good work bonding conditions.

The vertically movable platens 16 and 21 each have a longitudinally shiftable work charging-discharging table 30 and 31, respectively, associated therewith and as both tables are identical in structure the description of one table will be sufficient for a clear understanding of both constructions. With reference to Figs. 4, 5 and 6 the charging-discharging table 30 has a rectangular frame construction comprising a pair of longitudinally extending frame members 32 and 33 in the form of I-beams which are spaced from each side of the platen 16 in straddling relationship therewith. The frame members are secured together at their common ends by cross frame members 34 and 35, also of I-beam section. The closed frame structure thus formed carries a work support plate 36 secured at its marginal edges, as by welding, to top flanges of all the interconnected frame members. The work table is shiftably mounted on the vertically movable platen 16 in position such that the work support plate 36 is in contact with or just clears, the surface 26. As shown in Fig. 4 of the drawing the work support plate is shifted with the table in a horizontal plane slightly offset and above the pressure surface of the platen it serves. The plate is preferably made of non-corrosive sheet metal that is somewhat flexible to allow it to flex down upon the said platen when the adjacent platens are brought together to heat and press work held upon the support plate.

The means for mounting each work table on its platen comprises a number of roller devices 37 situated one at each corner of the platens 16 and 21. One of these roller devices is best illustrated in Fig. 5 and 6 and is there shown as comprising a bracket 38 bolted at 39 to an end wall 40 of the platen, said bracket having a longitudinally extending arm 41 on which is mounted a table support roller 42 that engages the bottom surface of a base flange 43 of the frame member 32. The bracket is also provided with a lateral arm 44 to which is bolted an upstanding block 45, said block carrying a hold-down roller 46 that bears against the upper surface of the I-beam base 43. It will therefore be understood that the work charging-discharging tables 30 and 31 are each mounted on their respective platens 16 and 21 for longitudinal shifting movement by means of the roller devices 37 mounted on the four corners of each platen and each in rolling engagement with both the top and bottom surfaces of the longitudinally extending frame members for the tables.

With reference to Fig. 1 of the drawings it will be noted that the length dimension of each work charging-discharging table is substantially greater than the longitudinal dimension of the platen it serves thus affording a two section table each having the length dimensions of the platen. Thus while a multi-ply panel carried by one half section of the table is being bonded by heat and pressure supplied by the press a number of plies of veneer are being built up upon the other longitudinally extended half section of the table. Upon completion of the multi-ply panel in the press, the press is opened and the table shifted to a position where the finished panel is upon the extended half of the table for discharge and charging operations whilst the previously built up panel is located between the press platens for the next heating and pressing operation of the press.

The means for shifting the tables 30 and 31 is shown best in Figs. 3 and 4 of the drawing as simultaneously actuated, reversible electric motors 47 each positioned upon a platform 48 that is in turn fixed to its respective platen 16 and 21. These motors have fixed to their armature shafts 49 individual sprockets 50 which engage chains 51 extending longitudinally beneath the tables 30 and 31 each having its ends secured in any suitable manner to the end portions of the table frame members 30 and 31. The chains run over respective idler sprockets 52 and 53 journalled on the platen 16 and 21 which serve to keep the chains taut and in engagement with the teeth of their respective drive sprockets 50.

Figure 2:
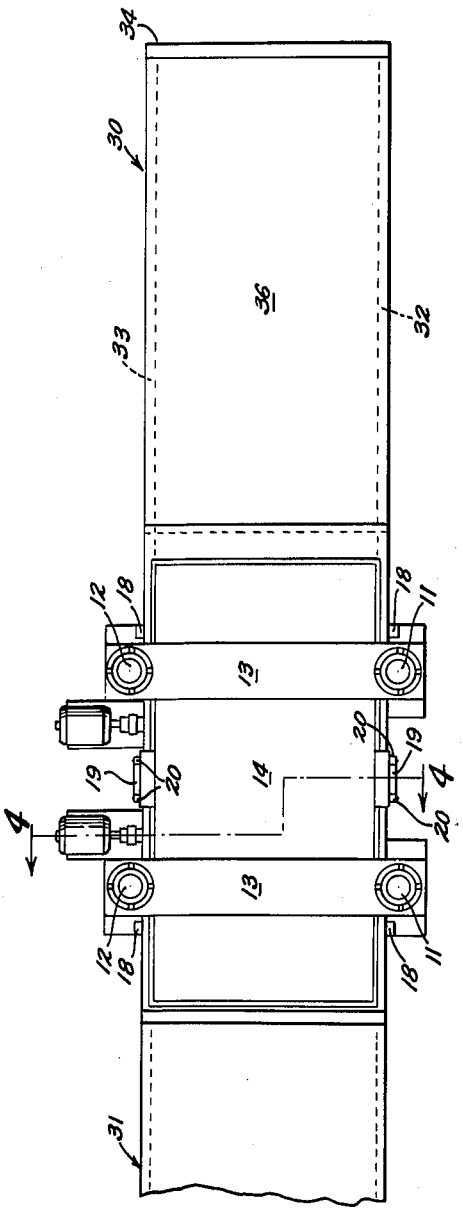
Fig. 2 is a fragmental, plan view of the device illustrated in Fig. 1.

In operation let us assume that the power cylinders are hydraulically operated to close the lights of the press and that work is being heated and pressed in the platens and that the work tables 30 and 31 assume the relative positions shown in full lines in Fig. 1. In these positions half sections of the tables extend in opposite longitudinal directions from the press, whilst the other half sections are disposed between their respective platens. Thus the right-hand half section of table 32 and the left-hand section of table 31, as illustrated in Figs. 1 and 2, are in positions to receive a stack of veneer that may be manually loaded thereon with suitable bonding ingredients applied between the veneer faces by operators standing adjacent said exposed table sections. When the said extended half sections of the tables have been charged and the bonding operation is completed the motors 47 are simultaneously actuated whereupon the tables 31 and 32 are shifted longitudinally in opposite directions, indicated by the arrows in full lines in Fig. 1, until said tables are in the positions shown by the dotted lines in said figure. In the latter position the work previously placed upon the tables are located between the vertically movable platens whereupon the hydraulic cylinders are actuated to push up the platens and place the work under heat and pressure until the stack of veneers are bonded together in multi-ply panels. During the bonding period the finished work of the previous bonding operation is taken from the extended half sections of both tables and new work pieces loaded thereon for the next press operation. It will be seen that opposite sections of the tables are presented for unloading-loading operations on opposite ends of the press whilst the other sections of the tables are in the press; thus in a two-station press a clear work unloading and loading position is available at each end of the press whilst carrying out practically continuous work bonding operations, the bonding being periodically discontinued only long enough to open the platens, simultaneously shift the tables in opposite directions and again close the platens.

What is claimed is:

1. In a press for making multi-ply panels, a base mounting a stationary platen, a pair of vertically movable platens mounted on the base below the stationary platen and disposed one beneath the other, a plurality of vertically acting motors fixed on the base and having their movable parts connected to the lowermost movable platen, a work charging and discharging table for each movable platen, roller means on each platen for shiftably mounting each table on its respective platen, each table comprising a pair of longitudinally extending frame members straddling its respective platen, cross members connecting the ends of the said frame members, a flat work support plate secured at its marginal edges to the table frame and cross members and supported thereby in a plane above the pressure face of the platen, said table having a length dimension greater than twice the length of the platen which it serves, and drive means actuated in unison for shifting the tables in opposite longitudinal directions on their respective platens.

2. A press for making multi-ply panels as set forth in claim 1 characterized by the fact that the roller means consists of a bracket mounted on each of the corners of the platen, a support roller on each bracket in rolling engagement with the base of the longitudinal frame member, and a hold-down roller on each bracket in rolling engagement with an upper surface of the said frame member.

3. A press for making multi-ply panels as set forth in claim 1 characterized by the fact that the drive means consists of an elongated chain fixed at its ends to the end portions of a longitudinal frame member for each table, and a motor driven sprocket mounted on each platen and meshed with the chain.

4. In a press for making multi-ply panels, the combination of a press base supporting a pair of opposed platens relatively movable toward and away from each other, an elongated work table mounted for longitudinal shifting movement on the base and said table consisting of a work support section that moves from between the platens to a work load-unload position to one side of the platens and another work support section that moves from a work load-unload position on the opposed side of the platens to a position between the platens.

5. In a press for making multi-ply panels, the combination of a press base supporting a fixed platen and a plurality of platens movable toward and away from the fixed platen, periodically operated power means on the base for operating the movable platens, an elongated work table mounted on the base for shifting movement between adjacently positioned platens, said table consisting of one work support section that moves from between the platens to a work load-unload position to one side of the platens and another work support section that simultaneously moves from a work load-unload position on the opposed side of the platens to a position between the platens, and power means on the base for moving adjacent work tables in opposite directions during dwell periods of the periodically operated power means.

References Cited in the file of this patent

UNITED STATES PATENTS

| 229,639 | Reynolds | July 6, 1880 |
| 489,399 | Treat | Jan. 3, 1893 |
| 1,949,917 | Muench | Mar. 6, 1934 |
| 2,129,276 | Herr | Sept. 6, 1938 |
| 2,138,047 | Turner | Nov. 29, 1938 |
| 2,171,511 | Winegar | Aug. 29, 1939 |